US011628853B2

(12) United States Patent
Nicolas et al.

(10) Patent No.: US 11,628,853 B2
(45) Date of Patent: Apr. 18, 2023

(54) METHOD FOR INSPECTING THE EMISSION OF AN AUDIO SAFETY MESSAGE IN A VEHICLE

(71) Applicants: Continental Automotive France, Toulouse (FR); Continental Automotive GmbH, Hannover (DE)

(72) Inventors: Michel Nicolas, Toulouse (FR); Majed El Hassan, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 453 days.

(21) Appl. No.: 16/966,956

(22) PCT Filed: Mar. 4, 2019

(86) PCT No.: PCT/FR2019/050474
§ 371 (c)(1),
(2) Date: Aug. 3, 2020

(87) PCT Pub. No.: WO2019/170988
PCT Pub. Date: Sep. 12, 2019

(65) Prior Publication Data
US 2021/0031794 A1    Feb. 4, 2021

(30) Foreign Application Priority Data
Mar. 5, 2018  (FR) ...................................... 1851859

(51) Int. Cl.
*H04N 5/44*    (2011.01)
*B60W 50/14*   (2020.01)
*B60W 30/08*   (2012.01)

(52) U.S. Cl.
CPC ............ *B60W 50/14* (2013.01); *B60W 30/08* (2013.01); *B60W 2050/143* (2013.01); *B60W 2050/146* (2013.01)

(58) Field of Classification Search
CPC ................. B60W 50/14; B60W 30/08; B60W 2050/143; B60W 2050/146; B60Q 9/00; G10L 19/018; G08G 1/0962
See application file for complete search history.

(56) References Cited

U.S. PATENT DOCUMENTS 5,379,345 A    1/1995 Greenberg
5,574,962 A    11/1996 Fardeau et al.
(Continued)

FOREIGN PATENT DOCUMENTS

CN    1422466 A    6/2003
CN    1739139 A    2/2006
(Continued)

OTHER PUBLICATIONS

International Search Report and Written Opinion for International Application No. PCT/FR2019/050474, dated May 27, 2019, with partial English translation, 8 pages.
(Continued)

*Primary Examiner* — Munear T Akki
(74) *Attorney, Agent, or Firm* — RatnerPrestia

(57) ABSTRACT

A method for monitoring the transmission of a safety audio message to the occupants of the passenger compartment of a vehicle. The method including transmitting an audio signal comprising the safety audio message and, mixed with said safety audio message, an identification signal including an identification digital audio message that is looped and frequency modulated, recording the ambient sound in the passenger compartment using a microphone, filtering and demodulating the signal to reconstruct the identification
(Continued)

signal, analyzing the reconstructed identification signal to determine: whether the unique identifier corresponding to the transmitted safety audio message is found therein, and whether the time for which the identification signal was transmitted without interruption is indeed equal to the known duration of the safety audio signal, determining that the safety audio message has or has not been correctly transmitted in its entirety depending on the analyzing step.

9 Claims, 2 Drawing Sheets

(56) References Cited

U.S. PATENT DOCUMENTS

| | | | |
|---|---|---|---|
| 10,399,490 B2 * | 9/2019 | You | B60Q 5/008 |
| 2003/0076955 A1 | 4/2003 | Alve et al. | |
| 2004/0102961 A1 | 5/2004 | Jensen et al. | |
| 2005/0177361 A1 | 8/2005 | Srinivasan | |
| 2005/0251273 A1 | 11/2005 | Bychowsky et al. | |
| 2013/0076504 A1 * | 3/2013 | Nakayama | G10K 15/02 340/463 |
| 2016/0133244 A1 | 5/2016 | Tzirkel-Hancock et al. | |
| 2016/0229340 A1 * | 8/2016 | Sakakibara | B60Q 5/008 |
| 2017/0096099 A1 * | 4/2017 | Matsubara | G10K 11/17855 |
| 2017/0358203 A1 * | 12/2017 | MacNeille | B60W 50/14 |

FOREIGN PATENT DOCUMENTS

| | | |
|---|---|---|
| CN | 102118655 A | 7/2011 |
| CN | 105592384 A | 5/2016 |
| GB | 2260246 A | 4/1993 |
| WO | 2017023313 A1 | 2/2017 |

OTHER PUBLICATIONS

International Search Report and Written Opinion for international Application No. PCT/FR2019/050474, dated May 27, 2019, 12 pages.
Chinese Office Action for Chinese Application No. 201980017367. 5, dated Aug. 24, 2021 with translation, 11 pages.

* cited by examiner

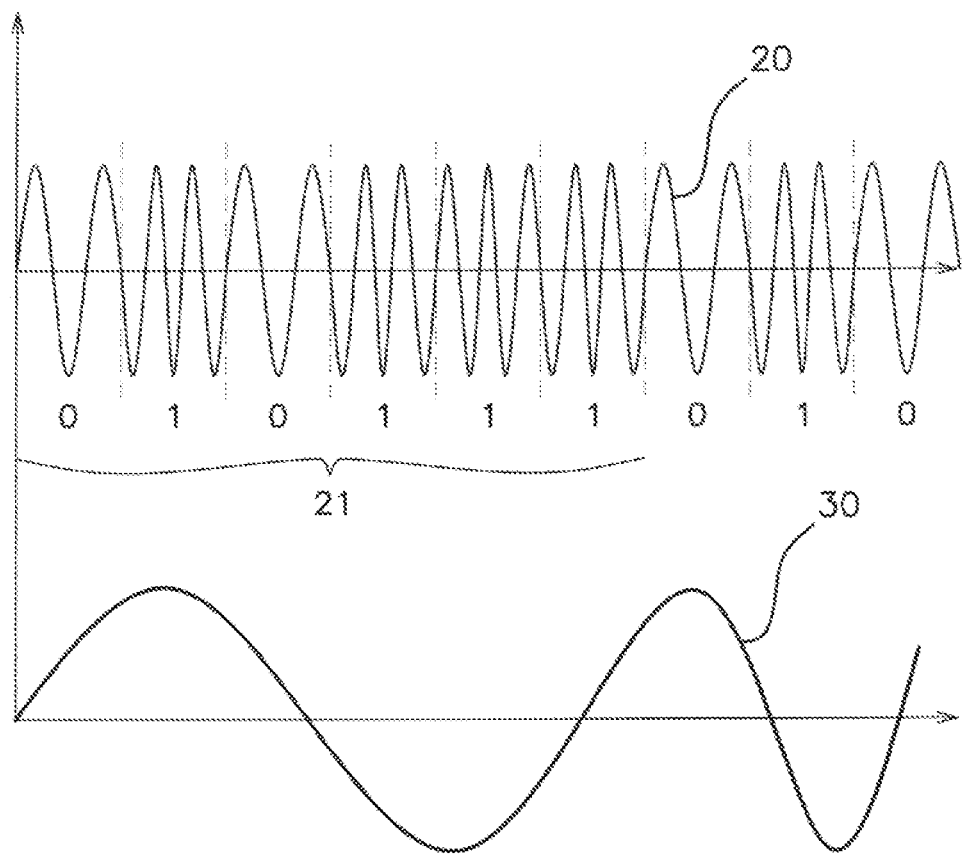

METHOD FOR INSPECTING THE EMISSION OF AN AUDIO SAFETY MESSAGE IN A VEHICLE

CROSS REFERENCE TO RELATED APPLICATIONS

This application is the U.S. National Phase Application of PCT International Application No. PCT/FR2019/050474, filed Mar. 4, 2019, which claims priority to French Patent Application No. 1851859, filed Mar. 5, 2018, the contents of such applications being incorporated by reference herein.

FIELD OF THE INVENTION

The invention relates to the field of transmission of audio messages, in particular automatic safety audio messages, via loudspeakers and especially loudspeakers located onboard a motor vehicle.

The present invention more precisely relates to a method for monitoring the correct transmission of such an audio message, and in particular of an automatic safety audio message onboard a vehicle.

BACKGROUND OF THE INVENTION

Many motor vehicles are nowadays equipped with a multimedia system or with an in-vehicle infotainment system that is especially able to deliver an audio signal to the passenger compartment.

In parallel, especially in the context of vehicles able to perform autonomous driving functions, audio messages, and especially automatic safety-related audio messages, are transmitted, on request by a processor of the vehicle, via the loudspeakers intended to transmit audio signals into the passenger compartment of the vehicle, to the occupants.

Such safety audio messages may consist of beeps, series of beeps or of more complex, pre-recorded audio messages.

How to guarantee that the occupants of the vehicle have actually, where appropriate, been able to hear the safety audio message is then the technical problem to be addressed. In other words, has said safety audio message been correctly transmitted as output from the loudspeakers to the occupants of the passenger compartment of the vehicle?

This difficulty in ensuring that a safety audio message has been correctly transmitted onboard a vehicle, in the prior art, is a safety defect that the present invention proposes to rectify.

One solution consists in recording the ambient sound via a microphone installed in the passenger compartment. When a safety audio message is assumed to have been transmitted via the loudspeakers, the recording taken via said microphone is then processed and filtered with a view to determining whether said safety audio message has been correctly transmitted or not.

It is then a question of comparing the audio signal recorded via the microphone with the original audio signal containing the safety audio message that was supposedly transmitted.

One drawback of this technique resides in the fact that the operation of processing/filtering the recorded signal and comparing it with an original audio signal is a complex operation because the recorded signal also contains ambient noise.

It is therefore very tricky to identify, with certainty, the safety audio message within the recorded signal, doubt then being cast on whether said safety audio message was correctly transmitted in its entirety in such a way as to have been able to be heard by the occupants of the passenger compartment of the vehicle.

SUMMARY OF THE INVENTION

There is therefore a need for a method that would allow the integrity of transmission of a safety audio message in the interior of a vehicle to be guaranteed.

An aspect of the invention is therefore to simplify and increase the reliability of the verification of the correct transmission of a safety audio message to the occupants of a vehicle passenger compartment.

To this end, an aspect of the present invention proposes to mix an identification digital audio message with any safety audio message before its transmission, said identification digital audio message being inaudible and containing a unique identifier of the safety audio message in question, said identification digital audio message being looped, i.e. played over and over, for the entire, known, duration of said safety audio message.

More precisely, one aspect of the invention is a method for monitoring the transmission of a safety audio message via at least one loudspeaker located onboard a vehicle to the occupants of the passenger compartment of said vehicle, said safety audio message having a known duration, said loudspeaker having a maximum frequency, said method comprising the following steps:
  transmitting an audio signal comprising the safety audio message and, mixed with said safety audio message, an identification signal comprising an identification digital audio message that is looped and frequency modulated, said identification signal having a frequency comprised between 20 kHz and a frequency ceiling lower than the maximum frequency of said loudspeaker, the identification digital audio message comprising a unique identifier associated with said safety audio message,
  recording the ambient sound in the passenger compartment by means of a microphone,
  filtering the recorded signal by means of a bandpass filter, so as to obtain a filtered signal having frequencies comprised between 20 kHz and the frequency ceiling,
  demodulating the filtered signal so as to reconstruct the identification signal comprising the looped identification digital audio message,
  analyzing the reconstructed identification signal to determine:
    whether the unique identifier corresponding to the transmitted safety audio message is found therein, and
    by counting the number of occurrences of the identification digital audio message in said reconstructed identification signal, whether the time for which the identification signal was transmitted without interruption is indeed equal to the known duration of the safety audio signal,
  determining that the safety audio message has or has not been correctly transmitted in its entirety depending on the analyzing step.

The method according to an aspect of the invention makes it possible to verify whether a safety audio message has been correctly transmitted in its entirety, in such a way as to be heard by the occupants of a vehicle.

Advantageously, the filtering obtained by means of the bandpass filter in the filtering step is carried out so as to select a frequency band comprised between 20 kHz and 22 kHz, which is inaudible to the occupants of the vehicle.

Advantageously, if at the end of the determining step it is determined that the safety audio message has not been transmitted or not been transmitted in its entirety, then the method comprises retransmitting the audio signal comprising the safety audio message and the identification signal.

Advantageously, if at the end of the determining step it is determined that the safety audio message has not been transmitted or not been transmitted in its entirety, then the method comprises displaying an information message on a display screen of the vehicle.

An aspect of the present invention also relates to a system intended to be located onboard a vehicle, comprising a loudspeaker, a microphone configured to record the ambient sound in the passenger compartment of the vehicle and a processor configured to implement the method briefly described above.

An aspect of the present invention also relates to a motor vehicle comprising such a system.

BRIEF DESCRIPTION OF THE DRAWINGS

Other features and advantages of aspects of the invention will become apparent from the following description, which is given with reference to the appended figures, which are provided by way of non-limiting example and in which objects that are similar have been referenced with identical reference signs.

FIG. 3 shows the principle of an identification digital signal mixed with a safety audio message.

DETAILED DESCRIPTION OF THE PREFERRED EMBODIMENTS

An aspect of the invention is envisioned mainly for implementation in a motor vehicle. However, other applications, in particular the implementation of the system and method according to an aspect of the invention in any other type of means for transporting passengers, is also targeted.

Figure 1:
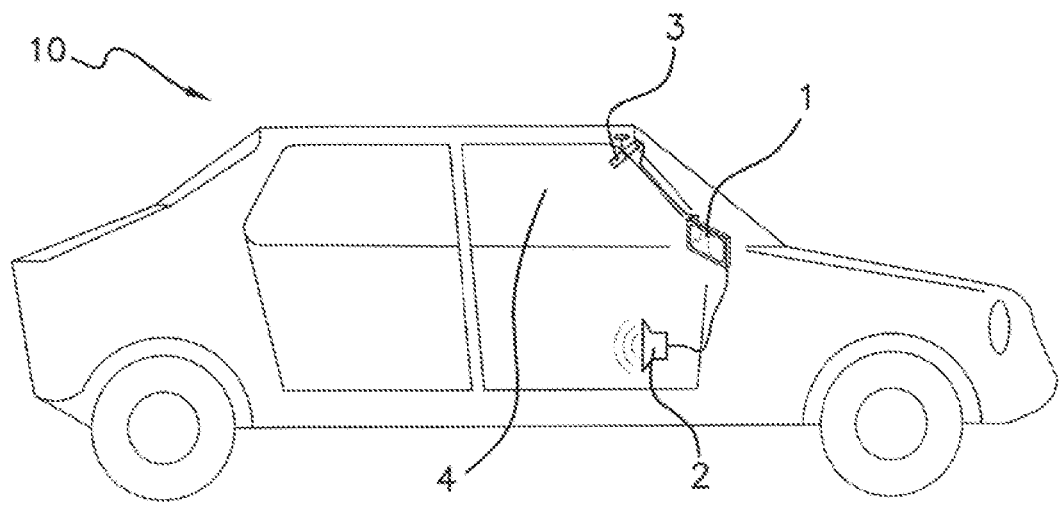
FIG. 1 shows the schematic of a vehicle equipped with a system capable of implementing an aspect of the invention.

FIG. 1 shows, by way of non-limiting illustration, a vehicle 10 in which an aspect of the present invention may be implemented. The vehicle 10 comprises an IVI system (IVI being the acronym of In-Vehicle Infotainment). This system comprises a processor 1, at least one loudspeaker 2 and at least one recording microphone 3.

The processor 1 is configured to transmit safety audio messages via the loudspeakers 2 to occupants of the passenger compartment 4.

Figure 2:
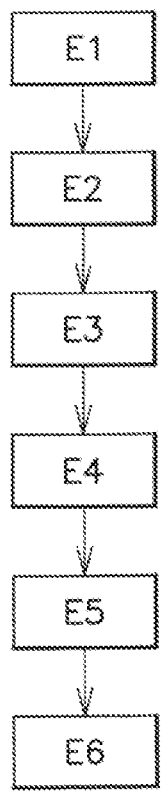
FIG. 2 shows a block diagram showing the steps of the method according to an aspect of the invention.

FIG. 2 shows a functional block diagram allowing the method according an aspect of to the invention to be described.

Thus, in a vehicle for transporting passengers, such as a motor vehicle, in which a processor 1 generates and transmits a safety audio message intended to be heard by occupants of the passenger compartment 4, provision is made for a step E1 of transmitting an identification digital audio message mixed with the safety audio message starting at a transmission time requested by said processor 1.

In other words, the processor 1 requests the transmission E1 of an audio signal comprising the safety audio message and, mixed with said safety audio message, an identification signal.

With reference to FIG. 3, the identification digital audio message 21 is thus frequency modulated to form the identification signal 20, the latter having inaudible frequencies that are higher than 20 kHz and lower than the maximum frequency that the one or more loudspeakers 2 are able to transmit.

In particular, the frequencies of the identification signal 20 are comprised between 20 kHz and 22 kHz, the maximum frequency that the one or more loudspeakers 2 are able to transmit being higher than 22 kHz.

The safety audio message 30 has a known duration, and the identification digital audio message 21 is mixed looped to form an identification signal 20, which is transmitted from the transmission time, which corresponds to the start of transmission of the safety audio message 30, and for a time equal to the known duration of the safety audio message 30.

With reference once again to FIG. 2, the method according to an aspect of the invention comprises recording E2 the ambient sound in the passenger compartment 4, and in particular the sound transmitted as output from the one or more loudspeakers 2.

The filtering E3 of the recorded signal comprises bandpass filtering that allows all audible frequencies to be removed from the signal, in order to eliminate any parasitic ambient noise therefrom.

In particular, the bandpass filter applied in step E3 produces a filtered signal solely containing frequencies comprised between 20 kHz and 22 kHz, the frequencies of the identification signal containing the identification digital audio signal being comprised between these limits.

The processing E4 of the filtered signal comprises demodulating said filtered signal so as to reconstruct the identification signal comprising the looped identification digital audio message.

Analysis E5 of the reconstructed identification signal makes it possible to determine whether the unique identifier corresponding to the transmitted safety audio message is found therein, and, by counting the number of occurrences of the identification digital audio signal, it is determined whether the time for which the identification signal was transmitted without interruption is indeed equal to the known duration of the safety audio signal.

At the end of the analyzing step E5, the determining step E6 makes it possible to determine whether transmission of the entire length of the safety audio message could be confirmed or not.

In case of non-confirmation of correct transmission of the safety audio signal, provision may be made to retransmit said safety audio message and/or to display an information message on a display screen.

It is clarified furthermore that aspects of the present invention are not limited to the examples described above, and is open to many variants that are accessible to those skilled in the art.

The invention claimed is:

1. A method for monitoring the transmission of a safety audio message via at least one loudspeaker located onboard a vehicle to the occupants of the passenger compartment of said vehicle, said safety audio message having a predetermined duration, said loudspeaker having a maximum frequency, said method comprising:

transmitting an audio signal comprising the safety audio message and, mixed with said safety audio message, an identification signal comprising an identification digital audio message that is looped and frequency modulated, said identification signal having a frequency comprised between 20 kHz and a frequency ceiling lower than a maximum frequency of said loudspeaker, the identification digital audio message comprising a unique identifier associated with said safety audio message, recording an ambient sound in the passenger compartment by a microphone, filtering the recorded signal by a bandpass filter, so as to obtain a filtered signal having frequencies comprised between 20 kHz and a frequency ceiling, demodulating the filtered signal so as to reconstruct the identification signal comprising the looped identification digital audio message, analyzing the reconstructed identification signal to determine:

whether the unique identifier corresponding to the transmitted safety audio message is found therein, and by counting a number of occurrences of the identification digital audio message in said reconstructed identification signal, whether the time for which the identification signal was transmitted without interruption is indeed equal to the predetermined duration of the safety audio signal, and determining that the safety audio message has or has not been correctly transmitted in the safety audio message's entirety depending on the analyzing step.

2. The method as claimed in claim 1, wherein, if at the end of the determining step it is determined that the safety audio message has not been transmitted or not been transmitted in its entirety, then a step of retransmitting the audio signal comprising the safety audio message and the identification signal is executed.

3. The method as claimed in claim 1, wherein, if at the end of the determining step it is determined that the safety audio message has not been transmitted or not been transmitted in its entirety, then a step of displaying an information message on a display screen of the vehicle is executed.

4. The method as claimed in claim 1, wherein the filtering obtained by the bandpass filter in the filtering step is carried out so as to select a frequency band comprised between 20 kHz and 22 kHz.

5. A system configured to be located onboard a vehicle comprising:

a loudspeaker, a microphone configured to record the ambient sound in the passenger compartment of the vehicle; and a processor configured to implement the method as claimed in claim 1.

6. A motor vehicle comprising a system as claimed in claim 5.

7. The method as claimed in claim 2, wherein, if at the end of the determining step it is determined that the safety audio message has not been transmitted or not been transmitted in its entirety, then a step of displaying an information message on a display screen of the vehicle is executed.

8. The method as claimed in claim 2, wherein the filtering obtained by the bandpass filter in the filtering step is carried out so as to select a frequency band comprised between 20 kHz and 22 kHz.

9. The method as claimed in claim 3, wherein the filtering obtained by the bandpass filter in the filtering step is carried out so as to select a frequency band comprised between 20 kHz and 22 kHz.

* * * * *